United States Patent Office 3,196,898
Patented July 27, 1965

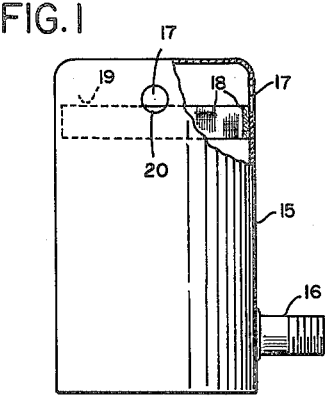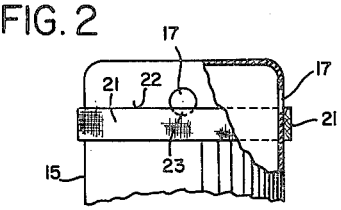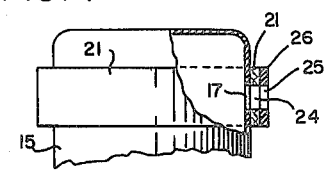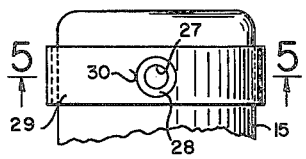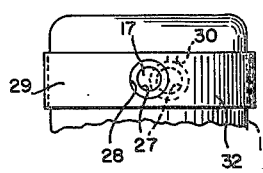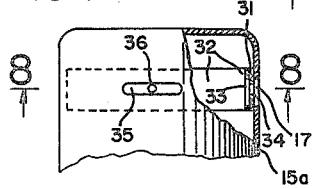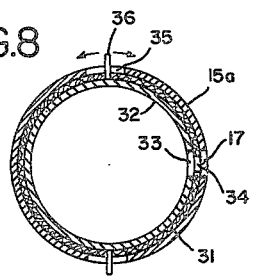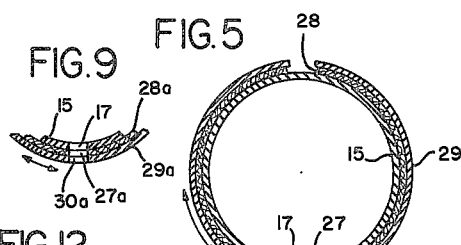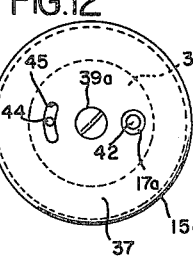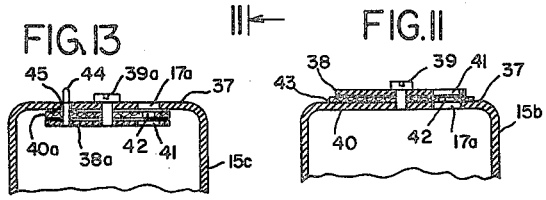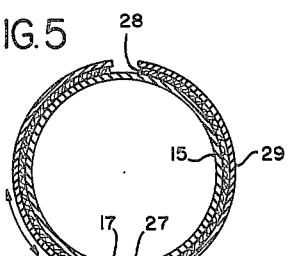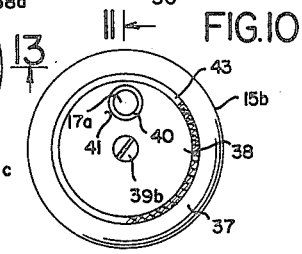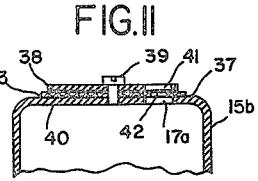

3,196,898
LOW PRESSURE STEAM RADIATOR AIR VENT VALVES
Otto C. Semonsen, 71 Superior Road, Bellerose 26, N.Y.
Filed Sept. 26, 1962, Ser. No. 226,430
9 Claims. (Cl. 137—314)

This application is a continuation in part of my co-pending applications Serial Nos. 31,463, now Patent No. 3,141,613 granted July 24, 1964, and 31,464, now Patent No. 3,067,945, granted December 11, 1962, both filed on May 24, 1960.

This invention relates to low pressure radiator valves and more particularly to the air vents or escape orifices thereof.

The structure of such valves which are used in low pressure steam heating systems, includes an air escape orifice through which the air passes out of the valve. Failure of the valve to function is frequently the result of the blocking of the escape orifice by condensate which has accumulated therein.

It is therefore an object of the present invention to provide a radiator air vent valve with means for preventing condensate from blocking the air escape orifice. This is accomplished by the use of an absorbent material so arranged in relation to the orifice that condensate which forms outside of the orifice and which enters thereinto, and condensate which forms within the orifice, will be extracted by absorption before it can accumulate sufficiently to block the orifice. The absorbent material may be any material which has the property of absorbing liquids and such material will hereinafter be referred to as a "wick."

It is known that the prior art includes a number of air vent valves, which utilize absorbent materials in their construction, but the instant invention is unique in that the absorbent material can and does extract condensate from the air escape orifice.

Another object of the invention is to provide a wick which is movably attached to the shell of the valve, either internally or externally, and which in addition to its property of extracting condensate from the air escape orifice also constitutes means for varying the effective area of the air escape orifice.

All radiator valves are provided with one or another of well-known means for controlling the flow of air and steam through the valve, but no such means is shown or discussed herein as the invention does not relate thereto. An example of such means is disclosed in my co-pending application Serial No. 31,464.

The above as well as additional and more specific objects will be clarified in the following description wherein reference numerals refer to like-numbered parts in the accompanying drawing. It is to be noted that the drawing is intended primarily for the purpose of illustration and that it is therefore neither desired nor intended to limit the invention necessarily to any or all of the details shown or described except insofar as they may be deemed essential to the invention.

Referring briefly to the drawing,

FIG. 1 is a side elevational view of a radiator valve, with parts broken away and partly in section, illustrating an embodiment of the present invention.

FIG. 2 is a fragmentary elevational view of a radiator valve, with parts broken away and partly in section, illustrating a modified form of the invention.

FIG. 3 is a fragmentary elevational view of a radiator valve illustrating another modified form of the invention.

FIG. 4 is a fragmentary elevational view, with parts broken away and partly in section, of a radiator valve provided with a further modified form of the invention.

FIG. 5 is a sectional view taken on the line 5—5 of FIG. 3.

FIG. 6 is a view similar to FIG. 3 except that it shows the external circumferential wick and its cover shifted on its axis.

FIG. 7 is a fragmentary elevational view of a radiator valve, with parts broken away and partly in section, showing yet another modified form of the invention.

FIG. 8 is a sectional view taken on the line 8—8 of FIG. 7.

FIG. 9 is a fragmentary view similar to FIG. 5 except that the aligned holes through the wick and its cover are of the same diameter as the air vent orifice.

FIG. 10 is a top plan view of yet another modified form of the invention.

FIG. 11 is a sectional view taken on the line 11—11 of FIG. 10.

FIG. 12 is a top plan view of a modified form related to that of FIGS. 10 and 11 except that the wick is mounted interiorly of the shell.

FIG. 13 is a sectional view taken on the line 13—13 of FIG. 12.

Since the present invention concerns itself solely with the air escape vent of a radiator valve, no other internal structure of such a valve is shown in the drawing. Every such valve has at least one air escape orifice or vent extending through the wall or shell of the valve. Further, some such valves have a unitary shell structure such as shown in the drawing, while others have the upper portion of the shell, which is provided with the air escape orifice, in the form of a separate or reduced cap fitted to the main body of the shell, not shown. The present invention applies to unitary shells such as shown in the drawing or shells which include both a main body portion and a cap; in either case the external wall constitutes an enclosing shell, or simply a shell, or housing.

The valve housings or shells shown in FIGS. 1-6 and 9 are all designated by the reference numeral 15, while that shown in FIGS. 7 and 8 are designated by the numeral 15a and that shown in FIGS. 10 and 11 is given the numeral 15b; in FIGS. 12 and 13 the shell is numbered 15c.

Each of the valve shells shown is of course provided with the usual nipple 16, shown only in FIG. 1, by means of which the valve is attached to a steam radiator, not shown, and which serves its usual purpose of permitting the entry of steam into the valve and also permitting condensate which is collected in the bottom of the shell to drain into the radiator. The air escape orifice in each of the shells 15 and 15a is designated by the numeral 17, while the same in the case of FIGS. 10 through 13 is designated by the numeral 17a. Some shells are shown with two orifices.

In the embodiment shown in FIG. 1, a wick 18 having a conformation complementary to the interior wall of the shell is fixed against the said wall by any suitable means such as, for example, cement, in such vertical position with respect to the vents 17 that the upper edge 19 of the wick extends across the lower portions 20 of the orifices 17. It is obvious that condensate which forms, or tends to form, within the orifice will be absorbed by the wick and thus will be unable to block the orifice.

In the modification shown in FIG. 2, the wick 21 is similar to the wick 18 and is also secured to the shell, but it is secured on the outside of the shell, and here also the top edge 22 of the wick extends across the lower portion of the orifice, indicated at 23, in a chordal relation thereto. The wick 21 functions in the same manner as the wick 18, in absorbing condensate which otherwise would block the orifices 17.

In the form shown in FIG. 4, the wick 21 is fixedly attached to the outside of the shell and in this respect is similar to the showing in FIG. 2, but the wick has a hole 24 therethrough in alignment with the orifice in the shell 15 and of the same diameter as the orifice 17. In addition, a covering 26 is provided encircling the wick and having a hole 25 therethrough also in alignment with and of the same diameter as the orifice.

In the form shown in FIGS. 3, 5 and 6, the wick is shown movably mounted on the exterior surface of the shell and provided with a hole 27 in alignment with but of smaller diameter than the orifice 17. This wick, shown at 28, has a cover 29 in the form of a flat metal spring or split ring normally tensed to reduce its diameter, shown in section in FIG. 5. Thus the cover 29 serves to hold the wick in place on the shell 15. The cover 29 is provided with a hole 30 which is shown as of the same diameter as the shell hole 17. By moving the wick and the cover from, for example, the position shown in full lines in FIG. 6, to that shown in broken lines, this structure also provides, through its movability, means for varying the effective area of the orifice. Varying the effective area of the orifice is accomplished by shifting the wick so that the hole therein is out of alignment with the orifice whereby the wick covers a portion of the orifice. FIG. 6 shows the wick thus shifted, but it is obvious that the wick may also be shifted upward or downward from the position shown in FIG. 3, not shown, instead of rotating it in a horizontal plane, as shown.

FIG. 7, together with FIG. 8, shows a structure for varying the effective area of the orifice 17 by shifting the wick on its axis when the wick is mounted on the interior of the shell 15a. Herein the wick 31 is positioned in contact with the interior surface of the shell and is held there by a cover 32 to which the wick may be cemented. The orifice 17 of the shell is shown as of the same diameter as the hole 33 in the cover, and both are shown of larger diameter than the hole 34 in the wick. Also, a horizontal slot 35 is provided through the shell 15a, and a pin 36 which is attached to the cover extends through this slot. It is obvious that by shifting the pin in the slot the wick may be moved into a position out of alignment with the orifice 17 to reduce the effective area of the orifice.

FIG. 9 shows fragmentarily an arrangement similar to that of FIG. 5 except that holes 27a and 30a, respectively in the wick 28a and the covering 29a, are shown having the same diameter as the orifice 17 and the shell 15.

FIGS. 10 and 11 show a radiator valve wherein the air escape orifice 17a is provided in the top or roof 37 of the shell 15b, and means is shown for varying the effective area of such an orifice. A disc or plate 38 is shown rotatably or pivotally mounted on the roof 37 through the medium of a pivot pin 39 which may consist of a screw threaded into a threaded opening 40 in the roof. An unattached wick substantially of the same shape as the plate is shown at 43, positioned between disc 38 and the roof 37; the wick may, if desired, be attached to plate 38 by any suitable means such as, for example, cement. The wick may have the same or even a smaller diameter than the plate, not shown, but it is shown having a larger diameter to provide a protruding circumferential edge to enhance evaporation therefrom. Plate 38 has a hole 41 therein, and wick 43 has a hole 42 therein shown having a smaller diameter than the orifice and the hole 41. FIGS. 10 and 11 show the three holes aligned, but obviously the hole in the wick may be shifted into disalignment with the orifice to any desired extent by turning the wick and plate together, or by turning the wick alone. Pin 39 may of course be made rigid, in any desired manner, with the roof, and it may be positioned as shown on the common axis of the plate and wick, as shown, or eccentric thereto, not shown.

FIGS. 12 and 13 show a modified structure for the shell 15c which is also provided with an escape orifice in its top 37, wherein the assembly is positioned against the inner surface of the roof. Herein, as shown, the wick 40a is positioned between a disc or plate 38a and the roof 37 and both are pivotally secured to the roof by means of a pivot pin 39a. The orifice is shown at 17a, the hole through the wick at 42, and the hole through the plate 38a at 41. The plate 38a has a finger grip pin 44, which may be substantially similar to the finger grip pin 36 of FIGS. 7 and 8, extending upward through an arcuate slot 45 in the roof 37. It is thus obvious that the effective area of the wick in this structure may readily be varied by moving the pin 44 along the slot 45.

In some of the modifications herein described the wick may be fixed to the shell and only the covering made movable. For example, in the case of the structure of FIGS. 10 and 11 for shells having the air escape orifice in the top 37 of the shell, the wick 40 may be fixed to the shell, as by cementing, and only the cover be made movable. In the case of the structure of FIGS. 12–13, the finger grip 44 passes through a suitable hole in the wick so that the wick moves with the plate 38a, and in the case of the structure of FIGS. 7–8, the grip 36 likewise passes through a suitable hole in the wick 31, so that in both these structures the wick moves with the finger grip. In case the wicks should be fixed to the shell in these structures so that only the covering, that is, the plate 38a or the band 32 moves with the finger grip, then of course a slot, not shown, similar to the slots 35 and 45, would also be provided through the wick in alignment with the said slots; it should not be necessary to illustrate such slots in the wicks. In this manner the effective area of the air escape orifice may thus be varied without shifting the wick.

In the case of all of the wicks described, the condensate which is drained away from the air escape orifice by the wick evaporates wholly or partly into the outside air or drains wholly or partly into the bottom of the shell.

Further, in all of the structures discussed herein, the wick, whether the hole or orifice in the shell is crossed by any portion of the wick or whether the edge of the wick coincides with the edge of the orifice, the wick drains condensation out of the orifice and thus prevents blocking of the orifice.

While certain preferred forms have been shown in the drawing and described herein, it is to be understood that the air escape orifice may be of any desired size or shape and located either on the side or on the top of the shell, and that the wick may be of any desired form and fixedly or movably attached in either internal or external relation to the shell, with or without a covering. The covering in each case serves not only to protect the wick but it may also serve as a means for holding the wick in position, and the covering may be of any desired suitable material.

Whereas various modifications have been disclosed and illustrated as stated above, such disclosure and illustrations are not to be construed as a limitation upon the invention which is best defined in the accompanying claims.

The invention having thus been described, what is claimed and desired to be secured by Letters Patent is as follows:

1. A radiator valve including a shell, a nipple for connecting the valve to a radiator, an air escape orifice through which air may escape from the shell, and a wick for extracting condensate from said air escape orifice, a portion of said wick being positioned within the circumference of said air escape orifice, the area of said portion being less than the area of said air escape orifice thereby leaving a portion of the air escape orifice unobstructed by said wick, said unobstructed portion providing for free movement of air out of said valve.

2. A radiator valve according to claim 1, said wick being in internal relation to said shell and movably mounted on a surface thereof, the wick being provided with means for holding the same in position.

3. A radiator valve according to claim 1, said wick being in external relation to said shell and fixedly attached to a surface thereof, the wick being provided with a covering.

4. A radiator valve according to claim 1, said wick being in external relationship to said shell and movably mounted on a surface thereof and provided with a covering.

5. A radiator valve according to claim 1, said wick being in external relation to said shell and movably mounted on a surface thereof and provided with means for holding the wick in a desired position.

6. A radiator valve according to claim 5, said means for holding said wick in a desired position comprising a cover.

7. A radiator valve according to claim 1, said wick having a hole therethrough substantially co-axial with said air escape orifice.

8. A radiator valve according to claim 7, said wick having a cover provided with a hole therethrough substantially co-axial with the hole in the wick.

9. A radiator valve according to claim 8, said cover being movably mounted on said wick.

References Cited by the Examiner

UNITED STATES PATENTS

| | | | |
|---|---|---|---|
| 116,608 | 7/71 | Lungren | 137—200 |
| 914,863 | 3/09 | McKendrick | 237—78 XR |
| 1,326,647 | 12/19 | Cotton | 137—197 |
| 1,804,167 | 5/31 | Keeney | 236—63 |
| 2,718,234 | 9/55 | Blumberg | 137—197 |

FOREIGN PATENTS 583,016   8/33   Germany.

WILLIAM F. O'DEA, *Primary Examiner.*

ISADOR WEIL, *Examiner.*